(12) United States Patent
Appel

(10) Patent No.: US 7,721,491 B2
(45) Date of Patent: May 25, 2010

(54) METHOD AND SYSTEM FOR STORING WATER INSIDE BUILDINGS

(76) Inventor: Jennifer Appel, P.O. Box 920622, Houston, TX (US) 77292

( * ) Notice: Subject to any disclaimer, the term of this patent is extended or adjusted under 35 U.S.C. 154(b) by 1116 days.

(21) Appl. No.: 11/187,120

(22) Filed: Jul. 22, 2005

(65) Prior Publication Data

US 2006/0016141 A1    Jan. 26, 2006

Related U.S. Application Data

(60) Provisional application No. 60/590,844, filed on Jul. 23, 2004.

(51) Int. Cl.
*B65D 90/04* (2006.01)
*B65D 90/02* (2006.01)

(52) U.S. Cl. .................. 52/169.7; 52/169.6; 52/168; 220/506; 220/503

(58) Field of Classification Search ............ 52/169.7, 52/169.6, 168; 137/357, 356, 376, 584, 1; 210/170.03, 196; 220/23.4, 586, 506, 503, 220/592.28
See application file for complete search history.

(56) References Cited

U.S. PATENT DOCUMENTS

| | | | | |
|---|---|---|---|---|
| 2,622,590 A | * | 12/1952 | Corbet et al. | 126/378.1 |
| 2,955,723 A | * | 10/1960 | McGrath | 220/565 |
| 3,356,251 A | * | 12/1967 | Roberts | 220/495.07 |
| 4,301,631 A | * | 11/1981 | Tazaki | 52/168 |
| 4,934,404 A | * | 6/1990 | DeStefano | 137/357 |
| 5,873,383 A | * | 2/1999 | Takai et al. | 137/357 |
| 6,299,775 B1 | * | 10/2001 | Elston | 210/605 |
| 6,526,699 B1 | * | 3/2003 | Foglio, Sr. | 52/15 |
| 6,705,344 B2 | | 3/2004 | Poirier | |
| 7,066,197 B1 | * | 6/2006 | Gray et al. | 137/357 |
| 7,207,748 B1 | * | 4/2007 | Urban | 405/51 |
| 7,472,718 B2 | * | 1/2009 | Ball | 137/295 |
| 2001/0035371 A1 | * | 11/2001 | Priggemeyer et al. | 210/162 |
| 2002/0189173 A1 | * | 12/2002 | Staschik | 52/79.1 |
| 2004/0040598 A1 | * | 3/2004 | Zimmerma et al. | 137/357 |
| 2005/0082212 A1 | * | 4/2005 | Wade | 210/170 |
| 2005/0138867 A1 | * | 6/2005 | Zhao | 52/79.1 |
| 2005/0241593 A1 | * | 11/2005 | Kaura | 119/496 |
| 2006/0169320 A1 | * | 8/2006 | Zimmerman et al. | 137/259 |
| 2008/0000649 A1 | * | 1/2008 | Guirguis et al. | 169/60 |
| 2008/0028704 A1 | * | 2/2008 | Cooper et al. | 52/302.1 |
| 2008/0034492 A1 | * | 2/2008 | Essig et al. | 4/507 |
| 2008/0073277 A1 | * | 3/2008 | Paoluccio et al. | 210/691 |
| 2008/0110505 A1 | * | 5/2008 | Coronado | 137/357 |
| 2008/0121579 A1 | * | 5/2008 | Dierkes | 210/170.03 |
| 2008/0149188 A1 | * | 6/2008 | Zimmerman et al. | 137/236.1 |
| 2008/0163562 A1 | * | 7/2008 | Conant | 52/16 |
| 2008/0312406 A1 | * | 12/2008 | DeBruin | 528/307 |

* cited by examiner

*Primary Examiner*—Phi Dieu Tran A

(57) ABSTRACT

The present invention provides a method, apparatus, and system to conserve resources, particularly rain water, by providing for water storage within building walls and other structural components. The building water storage allows reuse of water at that location that in the past has generally flowed to storm drains as runoff. Besides allowing reuse, another advantageous effect is that the structure may become a well insulated unit.

9 Claims, 6 Drawing Sheets

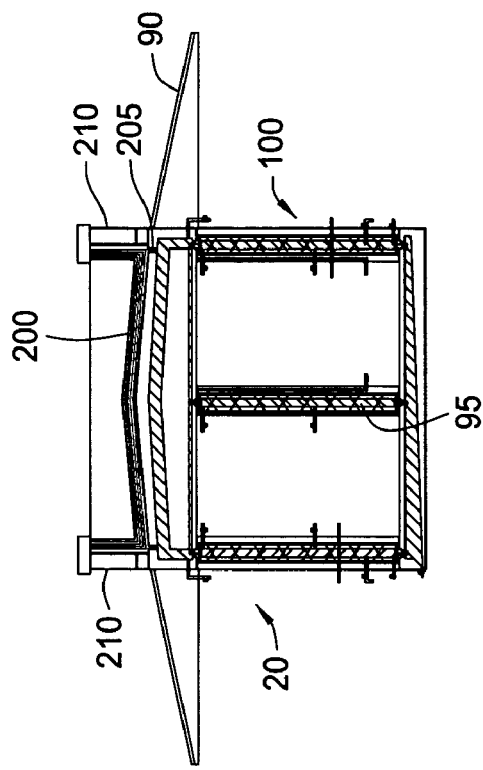
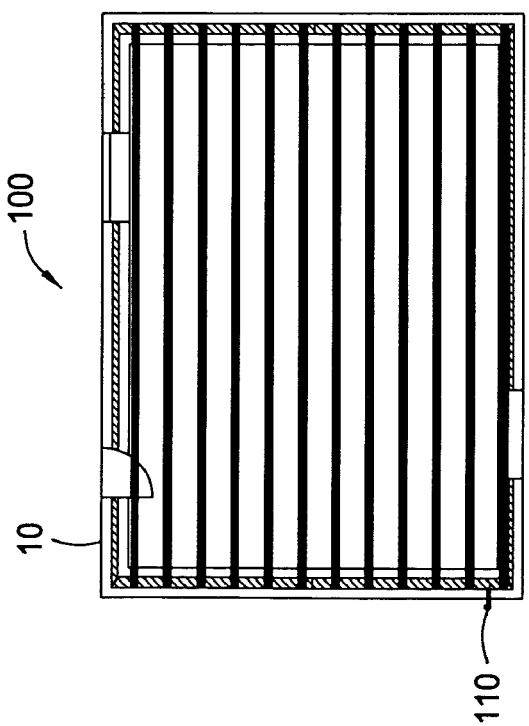

METHOD AND SYSTEM FOR STORING WATER INSIDE BUILDINGS

CROSS-REFERENCE TO RELATED APPLICATIONS

This application claims benefit of U.S. provisional patent application Ser. No. 60/590,844 filed Jul. 23, 2004, which is herein incorporated by reference.

BACKGROUND OF THE INVENTION

1. Field of the Invention

The invention relates to storing water inside buildings. More particularly, the invention relates to creating and using a water holding capacity inside building walls, columns, and other structural components.

2. Description of the Related Art

Protection, in the form of a constructed environment from the elements, is a basic requirement for all living organisms. As our communities have grown, modern construction methods fail to accurately incorporate the use of natural elements into our architecture.

With water quality declining from synthetic chemical use and potable chemicalization, rain water harvesting has become a useful tool to store water for potable and non-potable use. Due to the weight of water contained in a single or multiple stand alone vessels, structural cisterns are not practical for large scale rainwater reuse, such as in a high-rise building. Additionally, space of a single or multiple stand alone vessels is an issue in some of the single family buildings, such as zero lot line homes.

Therefore, there remains a need for an improved storage of water inside a structural component of a building and subsequent reuse therefrom.

SUMMARY OF THE INVENTION

The present invention generally provides a method, apparatus, and system to conserve resources, particularly rain water, by providing for water storage within building walls and other structural components. The building water storage allows reuse of water at that location that in the past has generally flowed to storm drains as runoff. Besides allowing reuse, another advantageous effect is that the structure may become a well insulated unit.

In one aspect, a catchment system for use in a building is provided. The catchment system includes a plurality of storage units operatively attached to structural members in the building, wherein the storage units are interconnected. The catchment system further includes an inlet in fluid communication with each storage unit and an outlet in fluid communication with each storage unit. The catchment system also includes a water source in fluid communication with the inlet.

In another aspect, a catchment system for harvesting, storing, and distributing rain water in a building is provided. The catchment system includes a plurality of storage units operatively attached to structural members in the building, wherein each storage unit is interconnected with another storage unit. The catchment system further includes an inlet and an outlet in fluid communication with each storage unit. Additionally, the catchment system includes a pump system for circulating the rain water.

In yet another aspect, a method of utilizing rain water in building is provided. The method includes collecting rain water from around the building and filtering the rain water. The method also includes redirecting the rain water to a catchment system disposed in the structure of the building, wherein the catchment system comprising a plurality of storage units, an inlet, and an outlet. The method further includes storing a portion of the rain water in the building and distributing a portion of the rain water in the building.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 is a view illustrating a storage unit in roof support structures of the building.

FIG. 10 is a view illustrating the catchment system in a building 20 with a green roof.

DETAILED DESCRIPTION

The present invention is generally directed to a method and apparatus for storing water inside a structural component of a building. Various terms as used herein are defined below. To the extent a term used in a claim is not defined below, it should be given the broadest definition persons in the pertinent art have given that term, as reflected in printed publications and issued patents. In the description that follows, like parts are marked throughout the specification and drawings with the same number indicator. The drawings may be, but are not necessarily, to scale, and the proportions of certain parts have been exaggerated to better illustrate details and features of the invention. One of ordinary skill in the art of water storage systems will appreciate that the embodiments of the invention can and may be used in various types of structures, such as single family building, garages, or a high-rise building.

Figure 1:
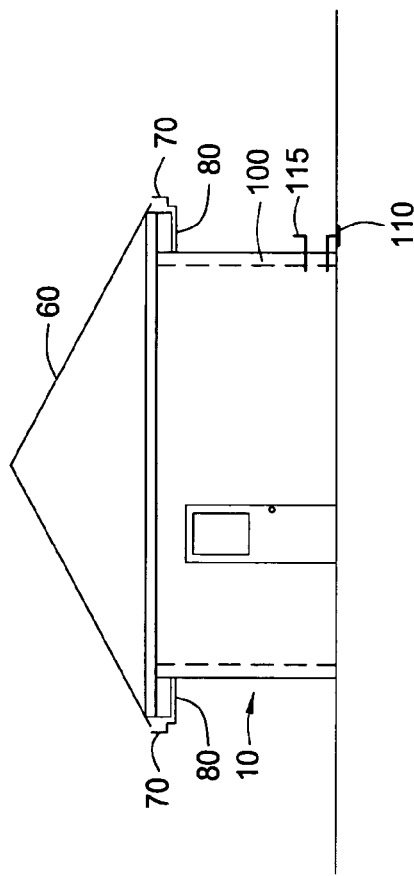
FIG. 1 is a view illustrating a building with a catchment system in accordance with the present invention.

FIG. 1 is a view illustrating a building 10 with a catchment system 100 in accordance with the present invention. Generally, the catchment system 100 is used to catch water, store the water in a structural component of the building 10 and subsequently release the water for reuse. The catchment system 100 may include waterproofed concrete walls, water holding elements, such as pipes made from PVC, copper, and other tubular materials, structural leak proof containers, and so forth. For ease of explanation, the invention will be described generally as it relates to a single building structure and a high-rise building. It is to be understood, however, that the invention may be employed in any number of building structures without departing from principles of the present invention.

As shown in the embodiment illustrated in FIG. 1, the building 10 includes a roof 60 and gutters 70. The gutters 70 are connected to the catchment system 100 by flow members 80. Generally, water, such as rain water, from the roof 60 and gutters 70 is redirected into the catchment system 100 within the building walls. Additionally, a secondary water source (not shown), such as city or well water, could be employed to supply water to the catchment system 100. The secondary water source typically includes a backflow to prevent cross connect.

An entrance to the water catchment system 100 could be fitted with a first flush by-pass to allow a percentage of water and solids, such as the first 10%, to be applied to the exterior landscape. Further, a Y-strainer (not shown) on an incoming water line could be incorporated and used as a flush device for clean out purposes.

An overflow outlet (not shown) and/or a scupper could be located proximate the top of the water catchment system 100 for overflow needs. In one embodiment, the overflow outlet is a pressure compensating valve constructed to allow for overflow water to pass from the water catchment system 100. Additionally, a clean out line 110 could be located proximate the bottom of the water catchment system 100 for ease of cleaning and maintenance. In one embodiment, the clean out line includes a standard ball valve, manual, or automatic valve for use in flushing and cleaning out the water catchment system 100. Optionally, a hose bib attachment 115 can be located at the exterior of the building 10.

The catchment system 100 may utilize a pumping system (not shown), such as a reverse osmosis system and/or an ozonation system and/or a sump pump, to provide clean fresh recirculation water within the building walls. This may help avoid buildup of materials and resolve mold issues, because mold grows in stagnant environments. The pumping system may be located within the building wall or as an external unit.

Potable water in the catchment system 100 could be available for various habitable or structural needs based on the architectural design. For instance, hot water heaters can be optional with in-line heating elements located on the tap line for each hot water spigot. Some locations could include the kitchen, bath, and clothes washer areas. Further, fire safety sprinkler systems in one or more rooms, such as in new construction, could be tapped from the catchment system 100 to provide fire protection in fire prone areas to lessen the need for municipal service assistance. Additionally, irrigation for a green roof (plants on top of a roof) or landscape applications may be tapped into the catchment system 100. This technology may create a substantial reduction in utility bills with respect to potable water and heating and cooling of a building.

Figure 2:
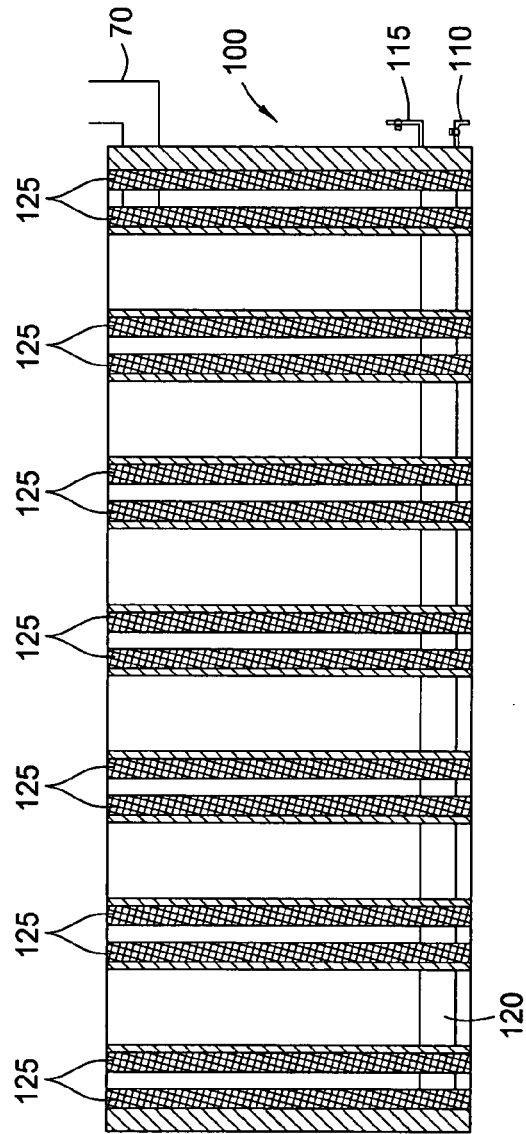
FIG. 2 is a view illustrating a portion of the catchment system in a wall of the building.

FIG. 2 is a view illustrating a portion of the catchment system 100 in a wall of the building 10. As shown, a plurality of storage units 125 is disposed within a wall of the building 10. The storage units 125 are attached and supported to the existing wall components, such as steel beams or studs. The storage units 125 are interconnected by at least one connection line 120. In one embodiment, the storage units 125 are PVC pipe. In between the storage units 125 and the frame construction, insulation may be blown or laid. Building architecture may include water holding capacity for a 2 year, 100 year, or 500 year design storm.

Figure 3:
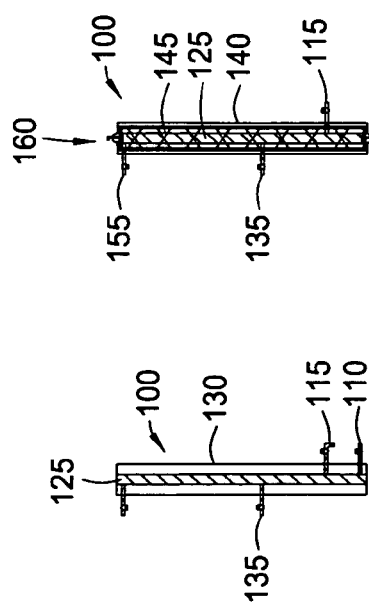
FIG. 3 illustrates a storage unit in a structural column.

FIGS. 3-6 illustrate the storage unit 125 in the various frame structures of the building 10. For instance, FIG. 3 illustrates the storage unit 125 in a structural column 130. Typically, the structural column 130 is an insulated waterproofed wall member with a structural reinforcing bar. The structural column 130 may be cast in place or poured in place. As shown in FIG. 3, the storage unit 125 may be connected to an interior tap 135 for use with interior water components, such as a washing machine and/or a water heater. In another embodiment, the storage unit 125 may be connected to the clean out line 110 and the hose bib attachment 115 as discussed above.

Figure 4:
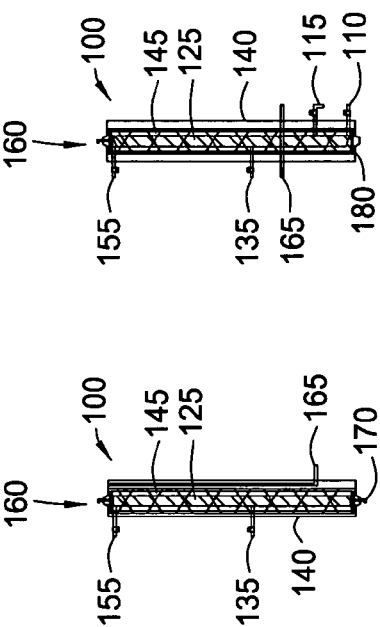

FIG. 4 illustrates the storage unit 125 in a structural column 140 with reinforcing bar bracing 145. In this embodiment, the reinforcing bar bracing 145 and the structural column 140 are used to support the storage unit 125. As shown, the storage unit 125 may include an optional fire sprinkler 155 outlet to provide fire protection in fire prone areas to lessen the need for municipal service assistance. The storage unit 125 may also include water inlet 160 at an end thereof for connection to a water source or another water storage unit. In another embodiment, a truss arrangement could be used in place of the column 140 and the bar bracing 145. In this embodiment, utility lines, such as gas, electric and cable lines, could be run in the truss arrangement.

Figure 5:
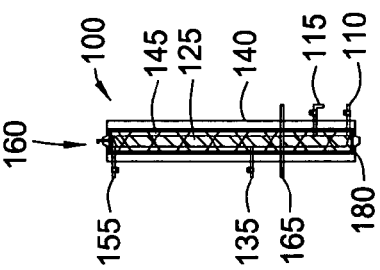

FIG. 5 illustrates the storage unit 125 in the structural column 140 with reinforcing bar bracing 145. In this embodiment, the storage unit 125 is connected to a utility conduit 165 to allow water in the storage unit 125 to exit outside the structural column 140. Additionally, the storage unit 125 is connected to a water outlet 170 to allow water to enter a floor detention facility (not shown). In operation, water may flow from a ceiling storage unit (not shown) through the water inlet 160 into the storage unit 125 and subsequently exit through the water outlet 170 into the floor detention facility. Additionally, in the embodiment shown in FIG. 5, the storage unit 125 may optionally be connected to the clean out line (not shown) and the hose bib attachment (not shown) as discussed above.

Figure 6:
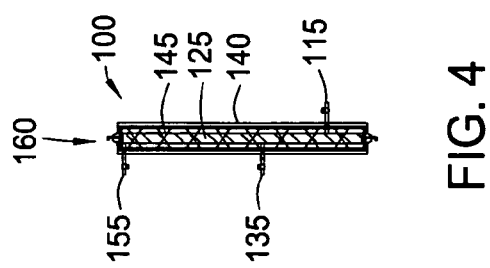
FIGS. 4-6 illustrate the storage unit in a structural column with reinforcing bar bracing.

Similar to FIG. 5, FIG. 6 illustrates the storage unit 125 in the structural column 140 with reinforcing bar bracing 145. The primary difference between the embodiment in FIG. 5 and FIG. 6 is that the storage unit 125 is not connected to the floor detention facility, but rather includes an interior slope 180. The interior slope 180 is utilized to ensure flow of fluid through the catchment system 100.

Figure 7:
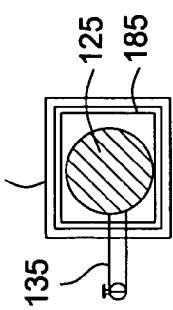
FIG. 7 is a view illustrating the storage unit in the structural column.

FIG. 7 is a view illustrating the storage unit 125 in the structural column 130, 140. As shown in FIG. 7, the structural column 130, 140 includes a reinforcing member 185 for use in supporting the storage unit 125. Although the structural column 130, 140 in FIG. 7 shows only one reinforcing member 185 attached thereto, any number of reinforcing members in any orientation may be attached to the structural column 130, 140 without departing from principles of the present invention.

FIG. 8 is a view illustrating a plurality of storage units 150 in roof support structures of the building 10. Similar to the storage units 125 in the wall of the building 10, the storage units 150 have the capacity to store water. The storage units 150 may be interconnected by a connection line (not shown). The storage units 150 are disposed and supported in structural members in a similar manner as the wall storage units 125. Typically, the storage units 150 include a fluid connection member (not shown) at each end thereof. The fluid connection member is generally used to connect the storage units 150 to another component such as the wall storage units (not shown), an interior water component, or an exterior water component.

Figure 9:
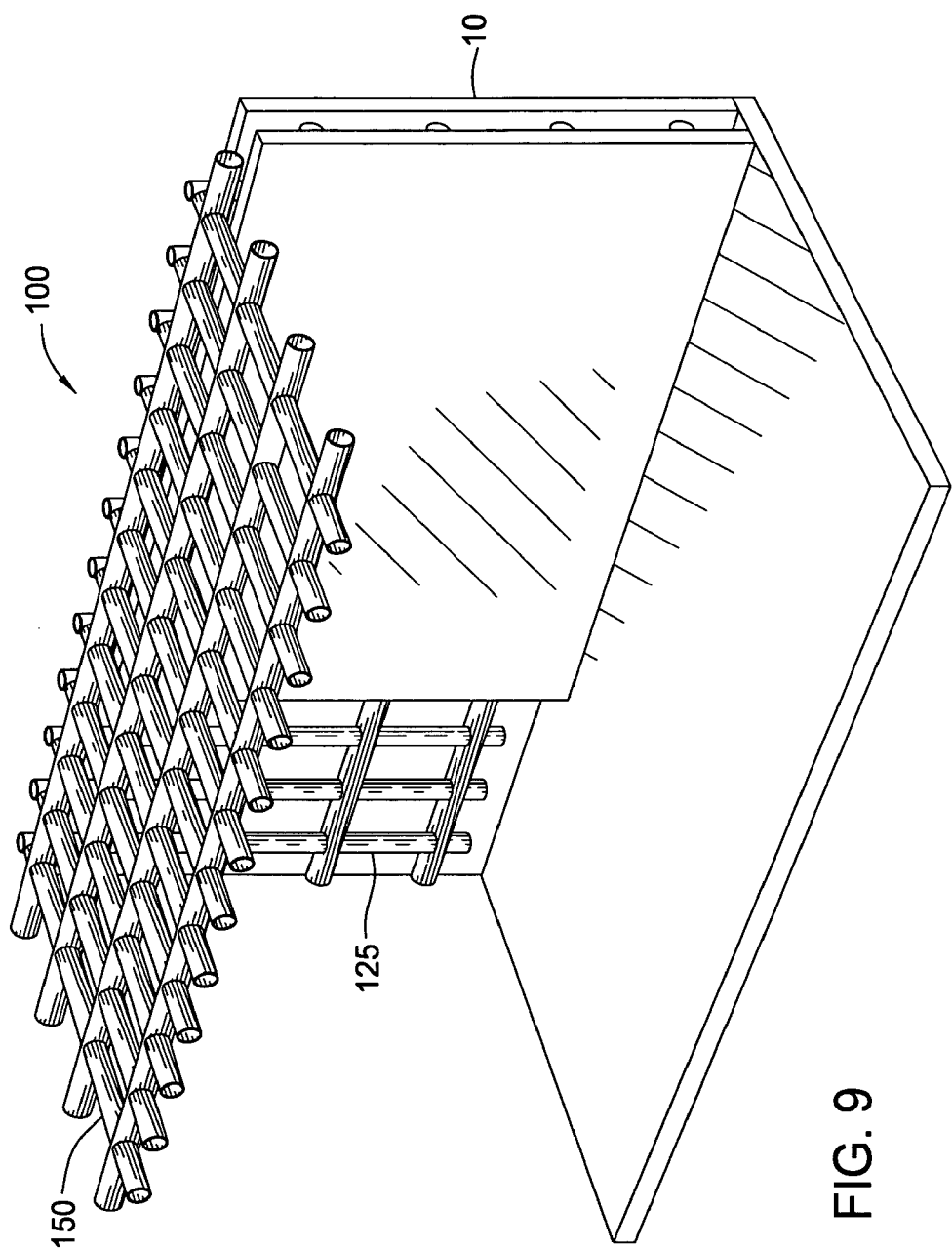
FIG. 9 illustrates the catchment system with ceiling storage units and wall storage units.

FIG. 9 illustrates one embodiment of the catchment system 100 with ceiling storage units 150 and wall storage units 125. In the embodiment shown, the storage units 150 are fluidly attached to the storage units 125 to provide increased water storage capacity in the catchment system 100. In another embodiment, either storage units 125, 150 of the catchment system 100 may be used independently.

FIG. 10 is a view illustrating the catchment system 100 in a building 20 with a green roof 200. As illustrated, the building 20 includes an optional columnar support 95 to support the green roof 200. The columnar support 95 may include additional storage units 125 to increase the capacity of the catchment system 100. The building 20 also includes a porch with a photovoltaic panel 90 attached thereto. The photovoltaic panel works in conjunction with the porch to reduce heat gain through the windows and extend the life of the structure. Additionally, the catchment system 100 in the building 20 may include similar components as described above, such as the utility conduit, the clean out valve, and the hose bib.

Generally, a green roof 200 is an extension of the existing roof which typically includes a root barrier, a media security, another root barrier, a filter fabric, a drainage material, a protection material, an insulation material, a waterproofing material, a lightweight growing medium, and plants. The green roof 200 may be modular, with drainage layers, filter cloth, growing media, and plants already prepared in movable, interlocking grids, or, each component of the system may be installed separately. In other words, the green roof 200 is a contained green space on top of a human-made structure. This green space could be below, at or above grade, but in all cases the plants are not planted in the "ground".

The green roof 200 is generally constructed by waterproofing above the deck, adding insulation above the waterproofing, placing a protection material above the insulation, adding a drainage material above the protection material, installing a filter fabric above the drainage material, placing a root barrier fabric above the filter fabric, adding a filter fabric media above the root barrier fabric, planting media above the root barrier fabric, locating media security above the planting media, and planting materials above the plant material security (irrigation fixtures and lighting conduit for the green roof 200 may be included in the planting media section).

Figure 11:
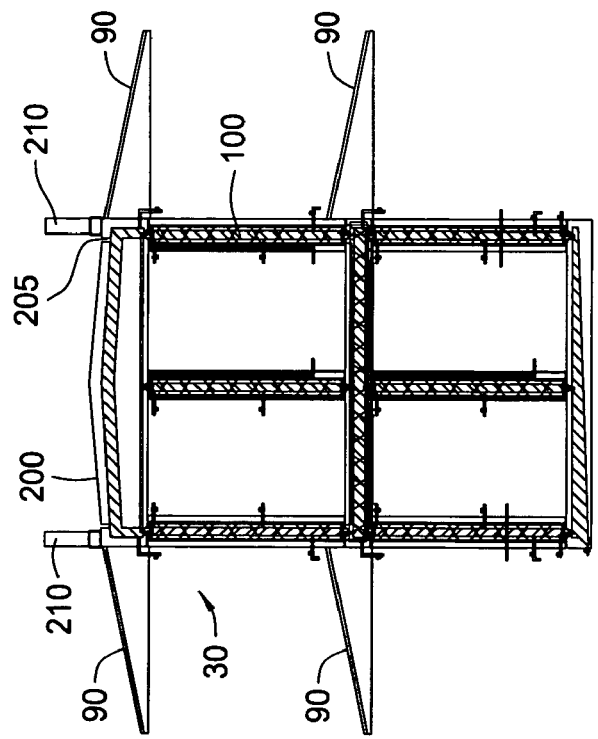
FIG. 11 is a view illustrating the catchment system in a multi-story building with the green roof.

In the embodiment shown in FIG. 10, the green roof 200 has sloped drainage to an exterior portion of the load bearing walls of the building 20. The green roof 200 also includes a retaining wall 210. As shown, the green roof 200 is connected to the catchment system 100 by an inlet 205 disposed proximate the retaining wall 220. The inlet 205 may include a removable grate or a solids filter (not shown) for filtering the solids from liquid prior to entering the catchment system 100. Additionally, an overflow scupper (not shown) may be used to allow overflow water to wash off a photovoltaic panel 90. Generally, water, such as rain water, is harvested from the green roof 200 and redirected into the catchment system 100 within the building walls in a similar manner as discussed above. In one embodiment, the entrance to the water catchment system 100 could be fitted with a first flush by-pass to allow a percentage of water and solids, such as the first 10%, to be applied to the exterior landscape. In another embodiment, the green roof 200 could be used as a filter to potentially eliminate the first flush by-pass. In other words, the green roof 200 construction could be used as a method for purifying the rain water in lieu of the first flush bypass. Similar to FIG. 10, FIG. 11 is a view illustrating the catchment system 100 in a multi-story building 30 with the green roof 200.

Figure 12:
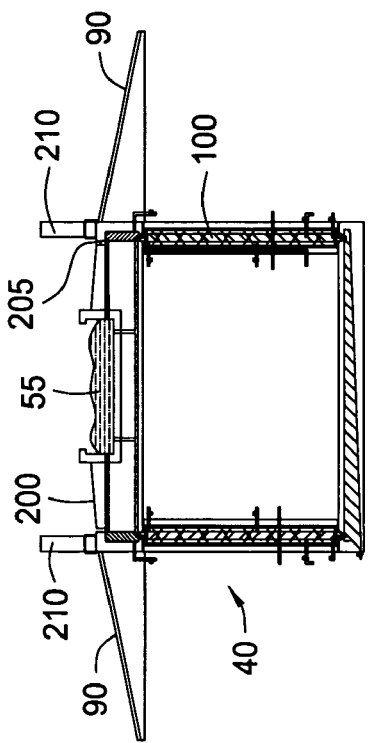
FIG. 12 is a view illustrating the catchment system in a building with the green roof and a pool.

FIG. 12 is a view illustrating the catchment system 100 in a building 40 with the green roof 200 and a pool 55. The pool 55 is positioned on the green roof 200 at a predetermined location. The pool 55 acts as a detention facility for storage of water. In one embodiment, a pergola with a glass roof (not shown) may be disposed on the pool. The glass roof is constructed and arranged such that evaporation accumulates on the inside of the glass structure and drips back down into the planting area of the green roof 200. Thus, reducing the amount of water needed to grow plants. Additionally, the pergola can be used as a shade structure or to hold additional PV panels. For support and hurricane wind loading, the pergola with the glass roof could be tied to the structural exterior walls of the building 40.

Figure 13:
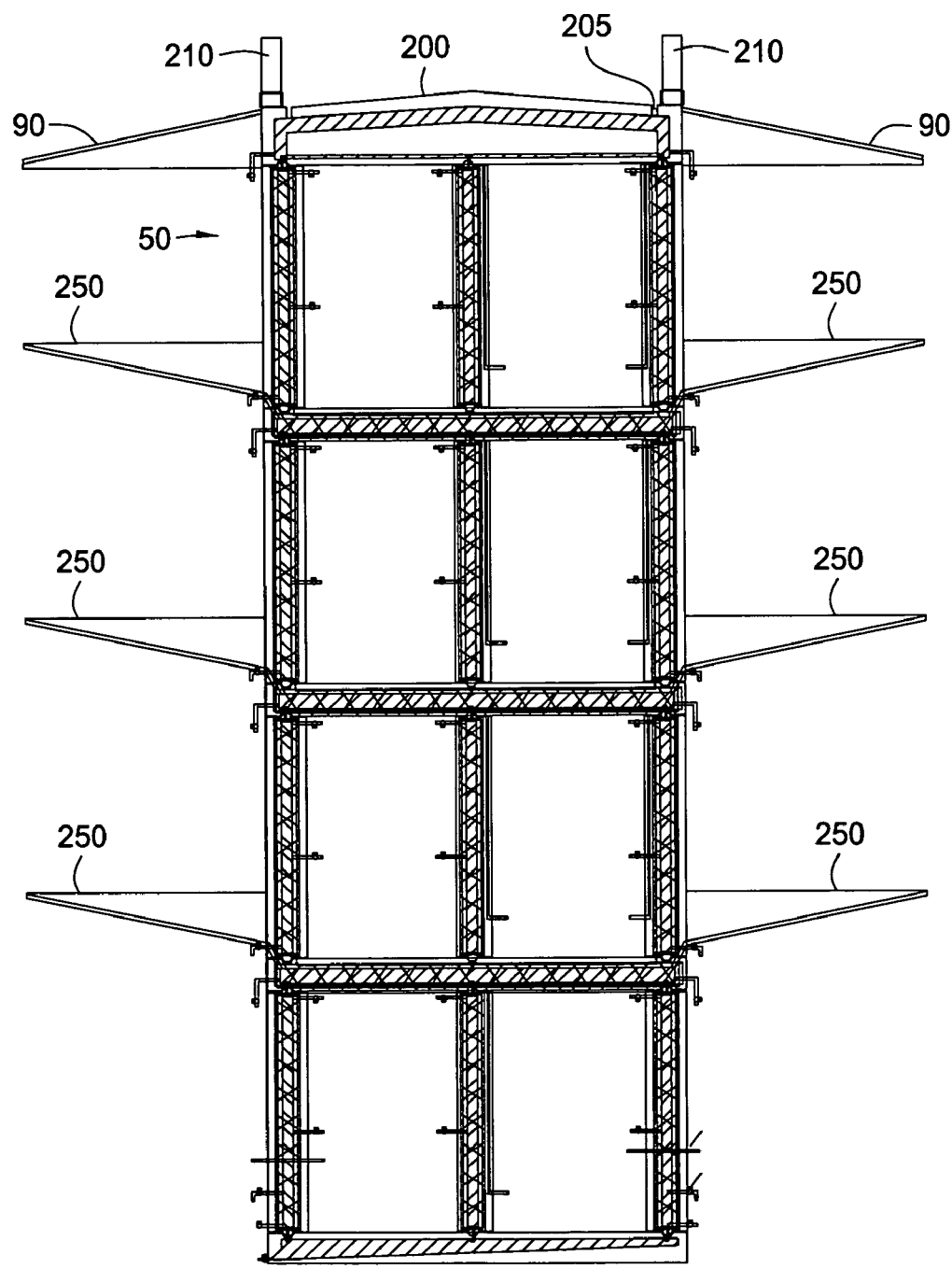
FIG. 13 is a view illustrating the catchment system in a multi-story building with a plurality of green roofs.

FIG. 13 is a view illustrating the catchment system 100 in a multi-story building 50 with the green roof 200 and several other adjacent green roofs 250. Similar to buildings 20 and 30 in FIGS. 10 and 11, building 50 includes the green roof 200 for harvesting and purifying water, such as rain water. Additionally, building 50 includes an additional green roof 250 for each floor of the multi-story building 50. Each green roof 200, 250 is connected to the catchment system 100 collectively or independently. In another embodiment, an independent catchment system 100 may be employed on each floor of the multi-story building 50. Additionally, each green roof 250 is connected to a porch eave for reducing heat gain through the windows and extending the life of the structure.

Various basics of the invention have been explained and shown herein. The various techniques and devices disclosed represent a portion of that which those skilled in the art would readily understand from the teachings of this application. Details for the implementation thereof can be added by those with ordinary skill in the art. Such details may be added to the disclosure in another application based on this application and it is believed that the inclusion of such details does not add new subject matter to the application. The accompanying figures may contain additional information not specifically discussed in the text and such information may be described in a later application without adding new subject matter. Additionally, various combinations and permutations of all elements or applications can be created and presented. All can be done to optimize performance in a specific application. While the foregoing is directed to embodiments of the present invention, other and further embodiments of the invention may be devised without departing from the basic scope thereof, and the scope thereof is determined by the claims that follow.

The invention claimed is:

1. A building catchment system comprising:
   a building with multiple side walls forming a parameter;
   a green roof having plants, the roof collects and filters rain water;
   an impurity filtering system for the rain water in addition to the green roof, the filtering system being the media by which the plants grow;
   a channeling system that moves the filtered rain water into the building walls;
   each of the side walls comprised of a waterproofed inner wall and a separate outer wall with a void space between, the inner and outer walls forming a wall system;
   the entire area of the void space between the inner and outer waterproofed walls is available for rain water storage;
   the void space between the walls does not include or require pipes or containers to hold the water between the walls;
   a pump system that moves the stored water, between the waterproofed inner and outer walls to provide potable water for interior and exterior applications;
   a temperature regulating device that allows the stored water to create and maintain ambient temperature within the building structure;
   an overflow device at the top of the wall system;
   exterior outlets for flushing the stored rain water out of the building walls.

2. The catchment system of claim 1, further including a flush by-pass valve system constructed and arranged to allow a predetermined amount of water to enter or exit the catchment system.

3. The catchment system of claim 1, further including a cleanout line disposed proximate an end of the catchment system for use in cleaning out the catchment system.

4. The catchment system of claim 1, further including a filtering pump system for circulation of the water in the catchment system.

5. The catchment system of claim 4, wherein the filtering system is one of a group consisting of reverse osmosis, ultra-violet light, charcoal, ozonation, and a combination of the different systems.

6. The catchment system of claim 1, further including a fire sprinkler outlet constructed and arranged to provide fire protection in fire prone areas in the building.

7. The catchment system of claim 1, further including a void space in the ceiling of the building.

8. A method of collecting and utilizing rain water stored in a building structure between an interior and an exterior waterproofed wall system, the method comprising:

providing a building catchment system;

the catchment system comprising a building with multiple side walls forming a parameter;

a green roof having plants, the roof collects and filters rain water;

an impurity filtering system for the rain water in addition to the green roof, the filtering system being the media by which the plants grow;

a channeling system that moves the filtered rain water into the building walls;

each of the side walls comprised of a waterproofed inner wall and a separate outer wall with a void space between, the inner and outer walls forming a wall system;

the entire area of the void space between the inner and outer waterproofed walls is available for rain water storage;

the void space between the walls does not include or require pipes or containers to hold the water between the walls;

a pump system that moves the stored water, between the waterproofed inner and outer walls to provide potable water for interior and exterior applications;

a temperature regulating device that allows the stored water to create and maintain ambient temperature within the building structure;

an overflow device at the top of the wall system;

exterior outlets for flushing the stored rain water out of the building walls;

provide a flush by-pass valve to allow a pre-determined amount of water to flow into the void space.

9. The method of claim 8, further including selectively pumping a portion of the rain water through a fire sprinkler outlet to provide fire protection in fire prone areas in the building.

* * * * *